US011623164B2

(12) United States Patent
Smith et al.

(10) Patent No.: US 11,623,164 B2
(45) Date of Patent: Apr. 11, 2023

(54) HORIZONTAL PRODUCTION SEPARATOR WITH HELICAL EMULSION CIRCULATION COILS

(71) Applicant: RED DEER IRONWORKS INC., Red Deer (CA)

(72) Inventors: Tyson Smith, Mack, CO (US); Todd Chamberlain, Loma, CO (US); Kelly Chamberlain, Loma, CO (US)

(73) Assignee: Red Deer Iron Works Inc., Red Deer (CA)

( * ) Notice: Subject to any disclaimer, the term of this patent is extended or adjusted under 35 U.S.C. 154(b) by 0 days.

(21) Appl. No.: 17/697,249

(22) Filed: Mar. 17, 2022

(65) Prior Publication Data

US 2022/0203264 A1 Jun. 30, 2022

Related U.S. Application Data

(63) Continuation of application No. 16/157,592, filed on Oct. 11, 2018, now abandoned.

(60) Provisional application No. 62/578,624, filed on Oct. 30, 2017.

(51) Int. Cl.
*B01D 17/04* (2006.01)
*B01D 19/00* (2006.01)
*B01D 17/02* (2006.01)

(52) U.S. Cl.
CPC ....... *B01D 17/042* (2013.01); *B01D 17/0217* (2013.01); *B01D 19/0052* (2013.01)

(58) Field of Classification Search
None
See application file for complete search history.

(56) References Cited

U.S. PATENT DOCUMENTS

| | | | |
|---|---|---|---|
| 2,582,134 A | 1/1952 | Kimmell et al. | |
| 3,603,101 A * | 9/1971 | Sullivan | F17C 7/00 122/15.1 |
| 3,962,999 A | 6/1976 | Rehm | |
| 4,203,300 A * | 5/1980 | Hanson | B01D 1/00 165/104.32 |
| 4,387,766 A | 6/1983 | Miller | |
| 5,979,549 A | 11/1999 | Meeks | |
| 6,047,767 A | 4/2000 | Bodhaine et al. | |
| 6,085,701 A | 7/2000 | Stauffer et al. | |
| 6,668,762 B1 | 12/2003 | Khosrowyar | |

(Continued)

FOREIGN PATENT DOCUMENTS

GB 2502247 A 11/2013

*Primary Examiner* — Robert J Popovics

(57) ABSTRACT

A separator for separating wellbore emulsions into liquid and gaseous components has helical emulsion preheat coils encircling a single-cylinder, dual chamber firetube disposed inside a horizontal separator vessel. In use, emulsion enters the preheat coils before entering the separator vessel. The flow of emulsion through the helical coils promotes initial separation of the emulsion by means of heat transfer and centrifugal flow. Resultant centripetal force separates lighter gaseous and liquid particles toward the inside of the helical coils, while heavier emulsion fractions condense toward the outside of the helical coils. The use of helical preheat coils and a single-cylinder, dual-chamber firetube eliminate or minimize abrupt changes in emulsion flow direction that are characteristic of prior art separators, resulting in reduced wear in both the coils and the firetube.

8 Claims, 8 Drawing Sheets

(56) References Cited

U.S. PATENT DOCUMENTS

| | | | | |
|---|---|---|---|---|
| 7,337,828 | B2 * | 3/2008 | Lange | F28D 15/06 |
| | | | | 122/31.1 |
| 7,416,667 | B2 * | 8/2008 | Benachenou | B01D 17/0208 |
| | | | | 210/DIG. 5 |
| 7,635,435 | B2 * | 12/2009 | Benachenhou | B01J 20/262 |
| | | | | 210/791 |
| 8,097,128 | B1 | 1/2012 | Sherry | |
| 8,721,895 | B2 * | 5/2014 | Benachenou | B01D 17/0208 |
| | | | | 210/671 |
| 9,103,561 | B2 | 8/2015 | Chandler | |
| 9,347,303 | B2 * | 5/2016 | Horst | C02F 1/02 |
| 9,469,552 | B2 * | 10/2016 | Horst | C02F 1/02 |
| 11,148,071 | B2 * | 10/2021 | Kelsey | B01D 17/045 |
| 11,498,020 | B2 * | 11/2022 | Nazzer | B01D 29/01 |
| 2012/0145373 | A1 | 6/2012 | Chadwick | |
| 2019/0126169 | A1 * | 5/2019 | Smith | B01D 17/0217 |
| 2022/0203264 | A1 * | 6/2022 | Smith | B01D 19/0052 |

* cited by examiner

HORIZONTAL PRODUCTION SEPARATOR WITH HELICAL EMULSION CIRCULATION COILS

FIELD

The present disclosure relates in general to apparatus for separating fluids from oil and gas wells into liquid and gaseous components, and relates in particular to horizontally-oriented production separators for initial heating and centrifugal separation of emulsion from an oil or gas well prior to entering a vessel for gravity and pressure separation.

BACKGROUND

Oil and gas wells typically produce an emulsion comprising, in varying proportions, hydrocarbon liquids (e.g., crude oil), hydrocarbon gases (natural gas), and water. Production separators, which may be horizontally, vertically, or spherically configured, are commonly used to heat the emulsion in order separate it into liquid, gaseous, and water fractions.

One commonly-used production separator circulates emulsion through a system of U-shaped piping loops disposed inside a horizontally-oriented pressure vessel. Each piping loop includes a pair of straight parallel pipe runs connected at one end by a short-radius 180-degree elbow, with the other ends of the straight runs (i.e., inlet and outlet ends) being connected to a flanged vessel head mounted to one end of the pressure vessel (typically by bolting), and with the elbow ends of all piping loops projecting from the vessel head into the interior of the vessel. The vessel head is fitted with suitable piping connections for receiving a flow of emulsion from a wellhead and flowing the emulsion through the piping loop system inside the vessel. A U-shaped horizontal firetube is provided inside the vessel below the piping loop system to transfer heat to the piping and the emulsion flowing therethrough. This particular type of separator is sometimes referred to as a "180-10-pass" design (denoting 10 piping loops with 180° elbows).

This type of prior art separator (which is illustrated in FIG. 1 herein) has a number of practical and operational drawbacks. For example, it is prone to high internal pipe wear, particularly at the short-radius 180° elbows. Another drawback is that the circulating emulsion tends to be further comingled due to the turbulent flow that unavoidably occurs as the emulsion passes through the elbows, thus detracting from the efficiency of the separation process. Furthermore, "U-tube" firetubes tend to corrode at a high rate, and they do not transfer heat evenly to the emulsion bath inside the separator vessel. In addition, flanged vessel heads of the type required for such prior art separators require a large number of bolts, plus a consumable gasket; for these reasons, assembly and disassembly of these separators are time-consuming processes, with considerable care being required during assembly to ensure a proper seal with the vessel.

BRIEF SUMMARY

The present disclosure teaches embodiments of a horizontal production separator that avoid or mitigate one or more the above-noted problems with conventional firetube separators. In accordance with one particular embodiment of a separator in accordance with the present disclosure, emulsion is preheated by flowing through a generally helical piping coil closely encircling a single-cylinder, dual-chamber firetube disposed inside a horizontal separator vessel, promoting initial separation of the emulsion by means of heat transfer and centrifugal flow. Resultant centripetal force separates lighter gaseous and liquid particles toward the inside of the helical coil, while heavier emulsion fractions condense toward the outside of the helical coil. The secondary flow within the helical coil promotes less wear, increases emulsion retention time, and naturally drops pressure. The helical configuration of the preheat coil and the use of a single-cylinder, dual-chamber firetube result in reduced wear in both the coil and the firetube because of the elimination of the abrupt changes in flow direction (and consequent increases in flow velocities) that characterize prior art separators due to their use of tight-radius piping bends.

The helical preheat coil serves as an initial phase of the emulsion separation process. Preferably, the coil will surround the firetube with little or no separation therebetween, in order to optimize heat transfer from the firetube to the coil by both radiant and conductive heating. Exhaust from the firetube is economized to reduce paraffin build-up in a high-pressure vertical scrubber associated with the separator vessel.

In preferred embodiments, the separator has "quick-removal" vessel heads at one or both ends of the separator vessel, for quicker and easier assembly and disassembly than for conventional bolt-on vessel heads. The helical coil and the single firetube are affixed to one of the quick-removal vessel heads, thus allowing for quick and easy removal of these components for inspection and cleaning.

In one variant embodiment in accordance with the present disclosure, the subassembly of the helical coil, the firetube, and the quick-removal vessel head can be adapted for retrofitting into a conventional horizontal separator, replacing the original straight-run emulsion tubing, U-shaped firetube, and bolt-on vessel head.

Accordingly, in a first aspect the present disclosure teaches a separator assembly comprising:
- a separator vessel having an interior chamber, a first end, and a first removable vessel head mountable to said first end of the separator vessel;
- a firetube disposed within the interior chamber of the separator vessel;
- a burner mountable to a first end of the firetube; and
- one or more helical coils for receiving a flow of emulsion, said one or more emulsion coils being disposed around the firetube.

In one embodiment, the firetube may be a single-cylinder firetube having a semi-cylindrical lower firetube chamber and a semi-cylindrical upper firetube chamber, with the one or more helical coils being of generally circular configuration as seen in end view.

In alternative embodiments, the firetube may be a U-shaped firetube as illustrated in FIGS. 1, 6, and 8 (i.e., comprising first and second firetube chambers in the form of a pair of parallel, spaced-apart lengths of cylindrical tubing connected at one end by a short piece of tubing), with the one or more helical coils being either of generally circular configuration as seen in end view, or of generally elliptical configuration as seen in end view.

The one or more helical coils, the firetube, and the first vessel head may be arranged so as to form a subassembly that is removable from the interior chamber of the separator vessel. Optionally, the subassembly may include the burner.

Optionally, the first removable vessel head may be a quick-removal vessel head.

The separator vessel may be oriented horizontally, but this is not essential. Depending on the operational requirements and constraints of a given installation, the separator vessel could have a non-horizontal orientation (e.g., vertical).

In a second aspect, the present disclosure teaches a separator assembly comprising:
- a separator vessel having an interior chamber, a first end, and a first removable vessel head mountable to said first end of the separator vessel;
- a firetube disposed within the interior chamber of the separator vessel;
- a burner mountable to a first end of the firetube; and
- one or more helical coils for receiving a flow of emulsion, said one or more helical coils being disposed below the firetube.

The firetube below which the one or more helical coils are disposed may be either a single-cylinder, dual-chamber firetube or a U-shaped firetube. The one or more helical coils may be of generally elliptical configuration, and optionally may be contoured for conformation with the shape of the firetube.

Separators in accordance with the present disclosure can be configured in sizes and orientations similar to existing separator designs, with changes to internal retention and economizing the exhaust to achieve optimal heat transfer. Initial emulsion flow is routed through helical coils that wrap around the single cylindrical firetube. The tight arrangement of coils, completely wrapping around the firetube, conducts and radiates heat through to the fluid, heating it to allow pressure reduction from the wellhead into the vertical gas scrubber.

BRIEF DESCRIPTION OF THE DRAWINGS

Embodiments in accordance with the present disclosure will now be described with reference to the accompanying Figures, in which numerical references denote like parts, and in which:

FIG. 2A is a transverse cross-section through the single-cylinder firetube and helical emulsion coils shown in FIG. 2, illustrating the semi-cylindrical lower and upper firetube chambers formed by the baffle plate bisecting the bore of the firetube.

DESCRIPTION

Figure 1:
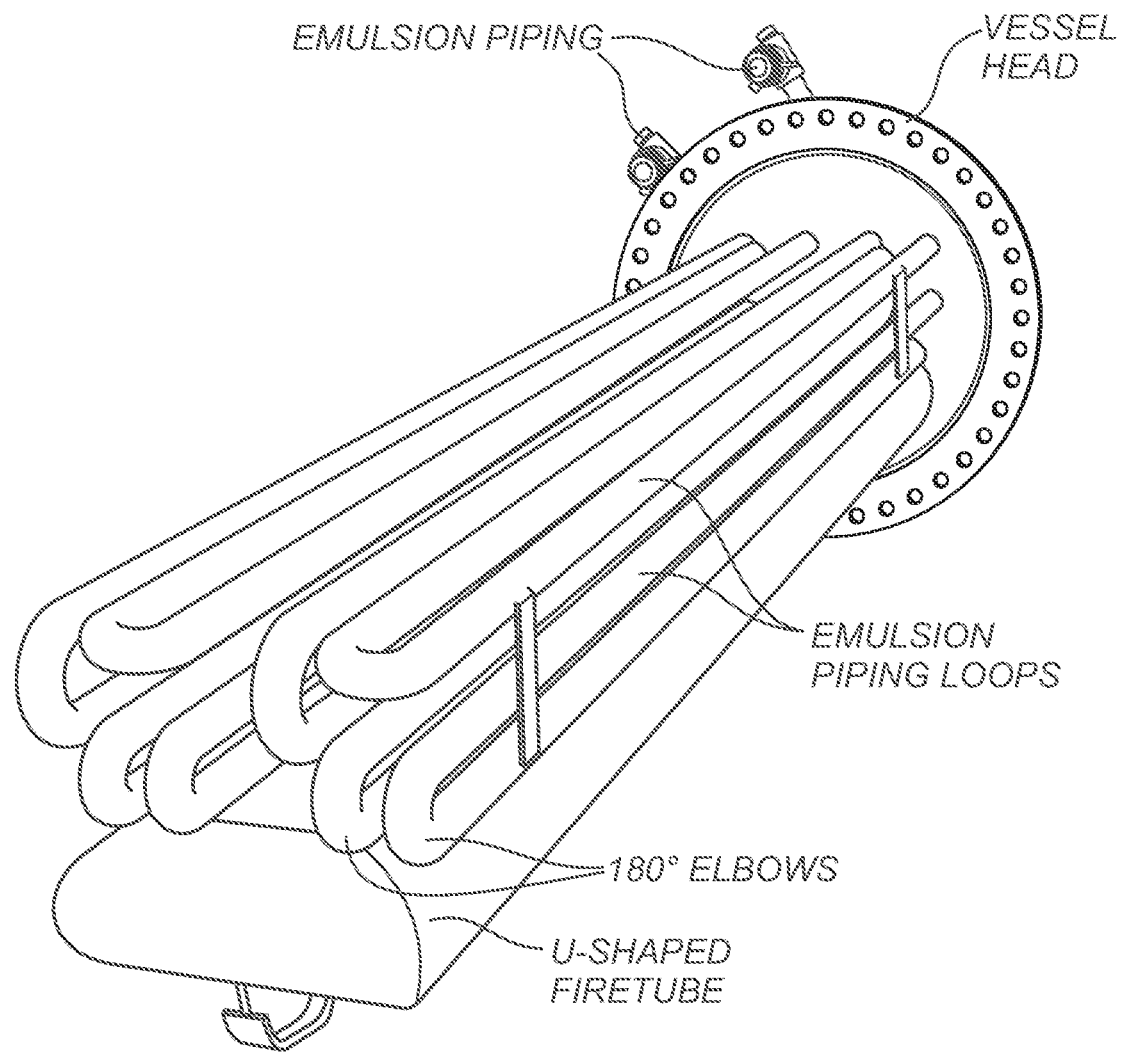
FIG. 1 illustrates the vessel head, emulsion piping assembly, and U-shaped firetube of a prior art "180-10-pass" separator, shown extracted from one end of the separator vessel.

The construction and operation of separator embodiments in accordance with the present disclosure will be readily apparent to persons of ordinary skill in the art, having regard to the accompanying Figures.

Having reference to the embodiment illustrated in FIGS. 2, 2A, 3, and 4, separator 100 includes a horizontal separator vessel 110 having an interior chamber 112, a helical primary emulsion preheat coil 120, and a helical secondary emulsion preheat coil 130, with helical emulsion coils 120 and 130 being coaxially disposed around a dual-chamber, single-cylinder firetube 140 having a closed inner end 140A and a baffle plate 141 that longitudinally bisects the cylindrical bore of firetube 140 between the outer end of firetube 140 and a free end 141A of baffle plate 141 disposed a selected distance away from the closed inner end 140A of firetube 140 to define a semi-cylindrical lower firetube chamber 142 and a semi-cylindrical upper firetube chamber 144.

A first quick-removal vessel head 116 is provided at the burner end of vessel 110, and a second quick-removal vessel head 114 is preferably provided at the other end of vessel 110. A burner 146 (typically gas-fired) is mounted to first vessel head 116 in a manner such that exhaust from burner 146 will flow into a first (or outer) end of lower firetube chamber 142 and around free end 141A of baffle plate 141 into upper firetube chamber 144, and thence through an elbow 150A into an exhaust duct 150 running horizontally above separator vessel 110 (all as schematically represented by flow arrows F in FIG. 3). Reference number 75 in FIG. 3 generally indicates a transition zone in which the semi-circular cross-sectional profile of upper firetube chamber 144 transitions into the generally circular cross-sectional profile of elbow 150A.

During operation of separator 100, emulsion from a wellhead enters primary preheat coil 120 via a preheat inlet 122 and flows to a choke (not shown) that reduces the pressure in primary preheat coil 120 to a predetermined level. This completes the first phase of the emulsion heating process. The emulsion then exits the choke and enters secondary preheat coil 130 for the second heating phase.

After the emulsion has gone through the second heating phase, it enters a control valve (not shown) which controls emulsion flow to separator vessel 110. The emulsion will then enter a vertical high-pressure bottle 160 located above economized exhaust duct 150. The emulsion will then start to separate by means of pressure and gravity in high-phase bottle 160. Comingled emulsion will then dump into the emulsion bath inside interior chamber 112 of vessel 110 where emulsion coils 120 and 130 and firetube 140 are located, in order to maintain a constant separation temperature. Primarily, water and oil will then be separated out of the emulsion. Secondarily, gas will be separated from the low-pressure horizontal unit. Emulsion coils 120 and 130 and firetube 140 are carried by quick-removal vessel head 116, which is sealingly connected to vessel 110.

Advantages of separators as exemplified by the embodiment shown in FIGS. 2, 2A, 3, and 4, relative to prior art separators such as the 180-10-pass design, include the following:

Emulsion flows from the wellhead into the helical coils starting immediate separation due to centrifugal force and high heat transfer.

Secondary fluid flow through the helical coils reduces pressure naturally and promotes better emulsion separation with minimal internal coil wear, whereas straight-run emulsion piping as in prior art separators is prone to high internal wear, especially at small-radius elbows.

Figure 2:
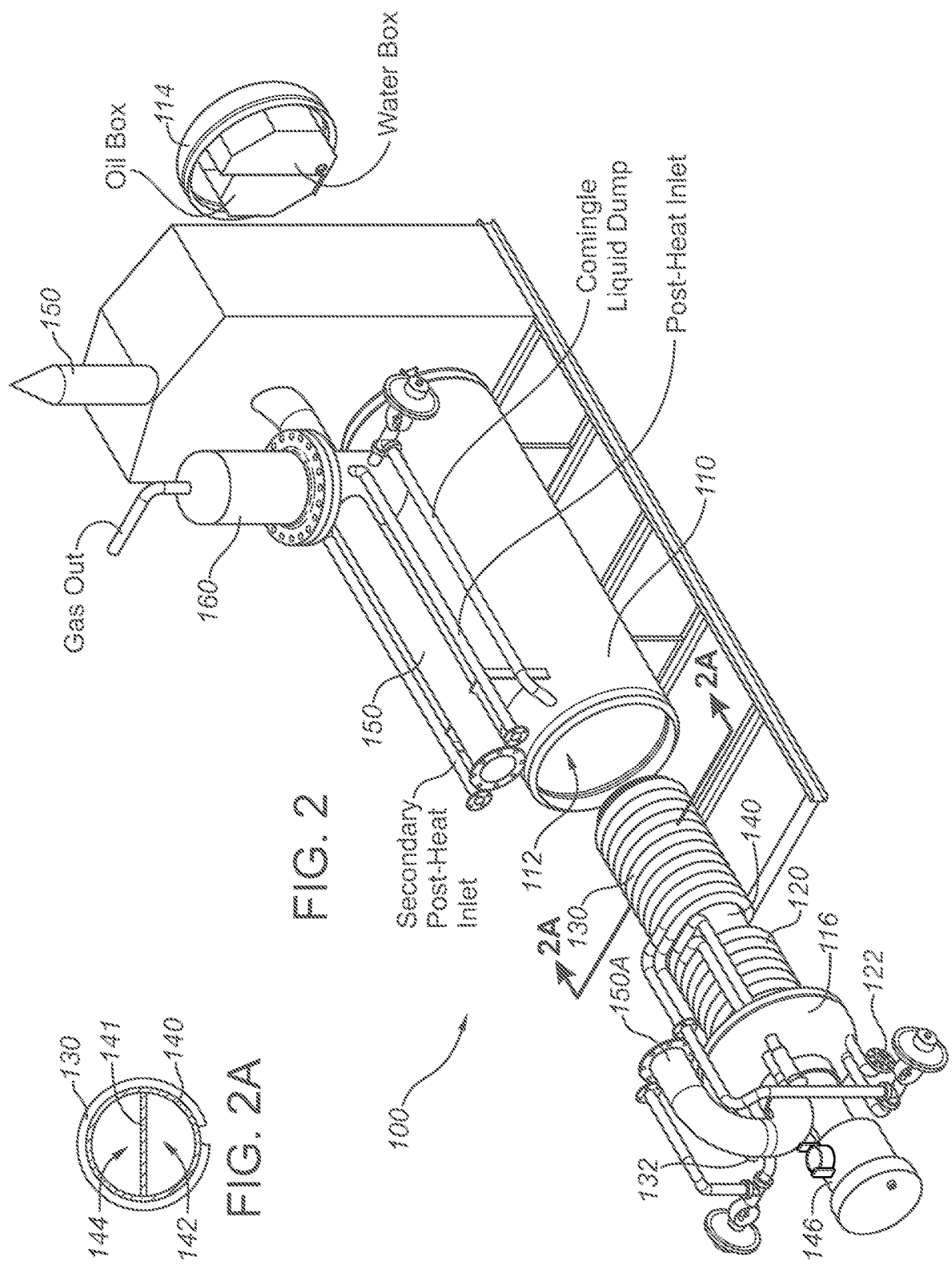
FIG. 2 is an exploded view of a first embodiment of a separator in accordance with the present disclosure, with helical emulsion piping coils disposed around a single-cylinder, dual-chamber firetube, and having quick-removal vessel heads.
Figure 3:
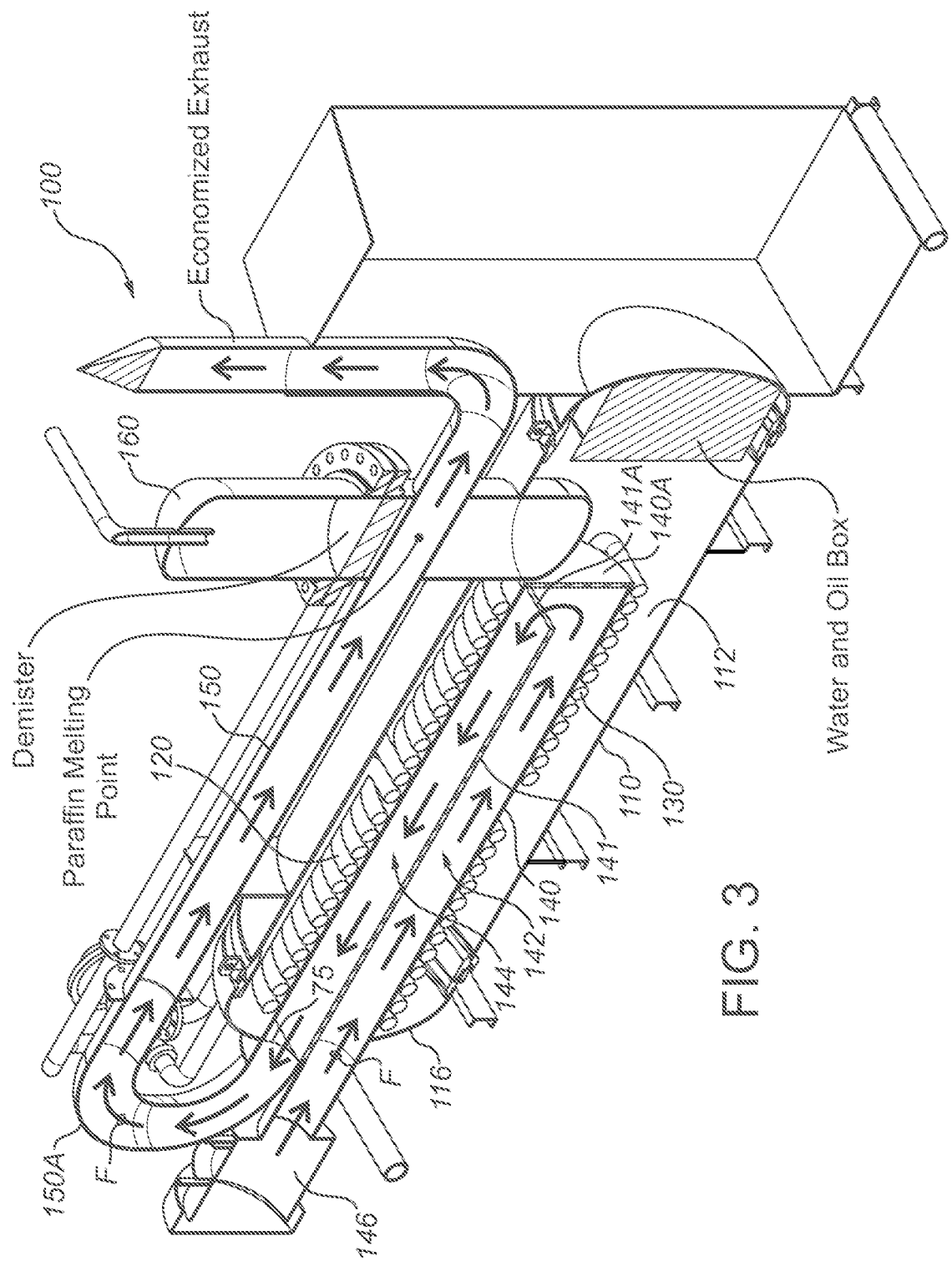
FIG. 3 is an oblique longitudinal cross-section through the separator shown in FIG. 2.
Figure 4:
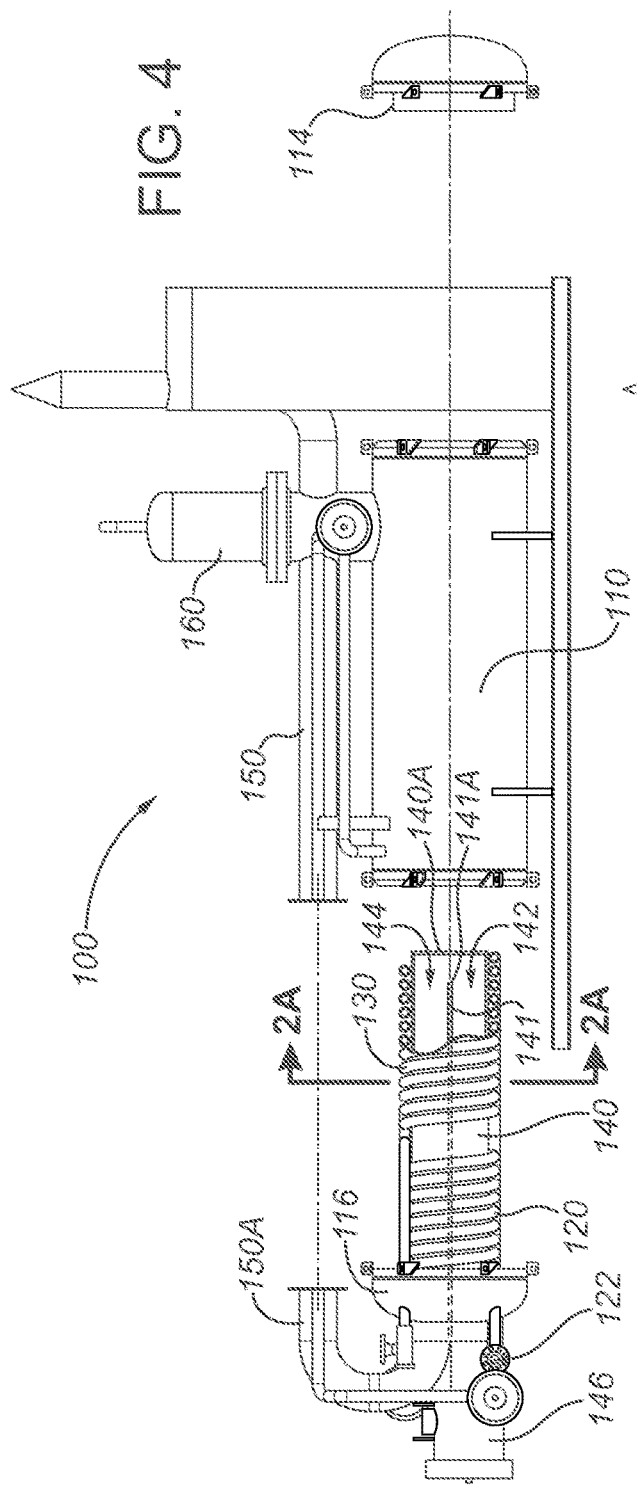
FIG. 4 is side view of the separator shown in FIG. 2.
Figure 4A:
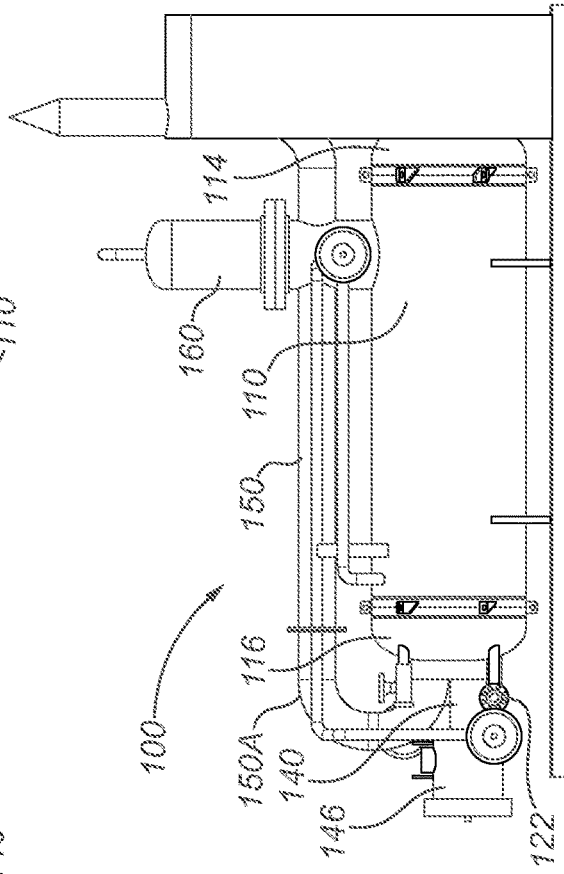
FIG. 4A is a partially-exploded version of FIG. 4, illustrating removal of the vessel head at one end of the separator vessel, and removal of the vessel head/firetube/emulsion piping subassembly from the other end of the separator vessel.
Figure 5:
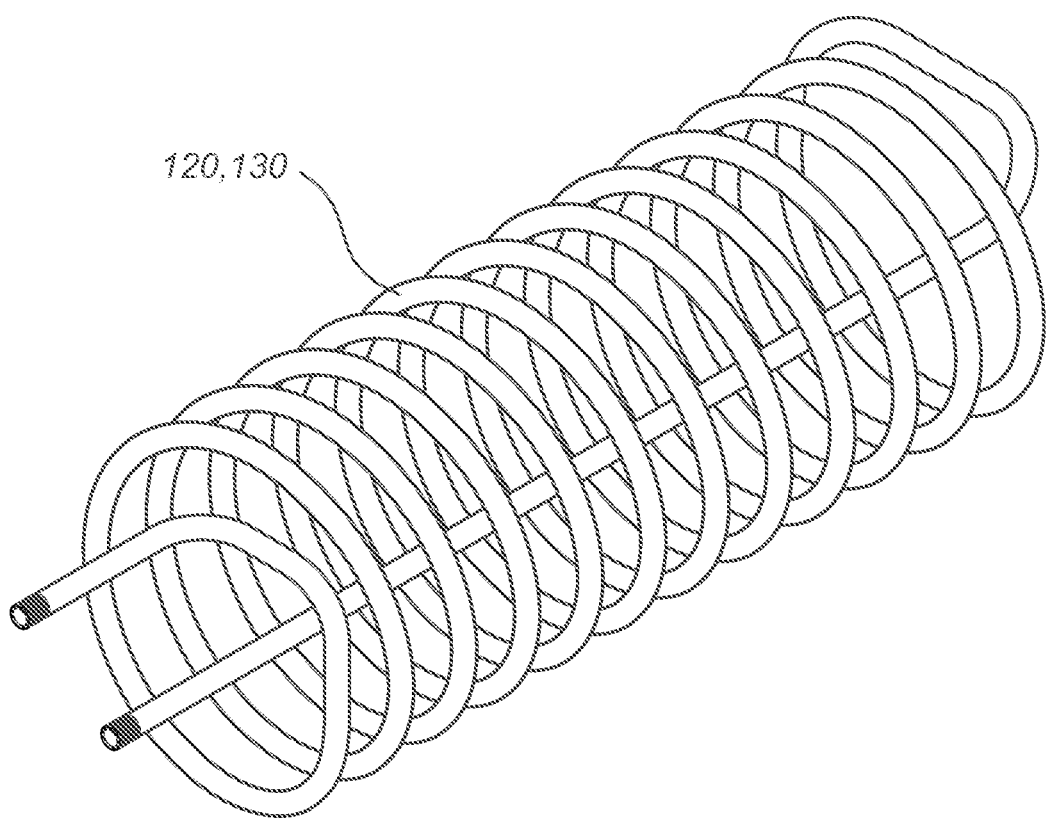
FIG. 5 is an isometric view of an exemplary embodiment of a helical emulsion piping coil in accordance with the present disclosure.

The dual-chamber, single-cylinder firetube transfers and maintains heat better and more efficiently than prior art U-shaped firetubes, while having a smaller volumetric footprint (i.e., the emulsion coils and firetube of the separator in FIGS. 2-4, in combination, take up less volume inside the vessel than the emulsion piping and firetube of the prior art separator).

The helical coils wrapped around the single-cylinder firetube are heated through both conductive and radiant heating.

The firetube and helical coil configuration maintains high emulsion retention with a small volumetric footprint inside the separator vessel.

Compared to conventional separators of similar size, higher efficiency and higher emulsion throughput are achievable due to the smaller volumetric footprint of the internal components (i.e., single-cylinder firetube and helical coils).

Exhaust economizer routing exhaust through the vertical scrubber (i.e., high-pressure bottle) and building can be used to heat low-temperature areas.

Exhaust from the burner is routed through the vertical scrubber to reduce paraffin buildup.

Exhaust from the burner may also be routed to heat the separator control building and thereby reduce or prevent freezing on sight glasses and valves in the building.

Quick-removal vessel head allows for quick access to the separator vessel for inspection and cleaning.

Metal sealing surfaces on the quick-removal vessel heads facilitate provision of a safe and efficient seal between the vessel and vessel heads.

Figure 6:
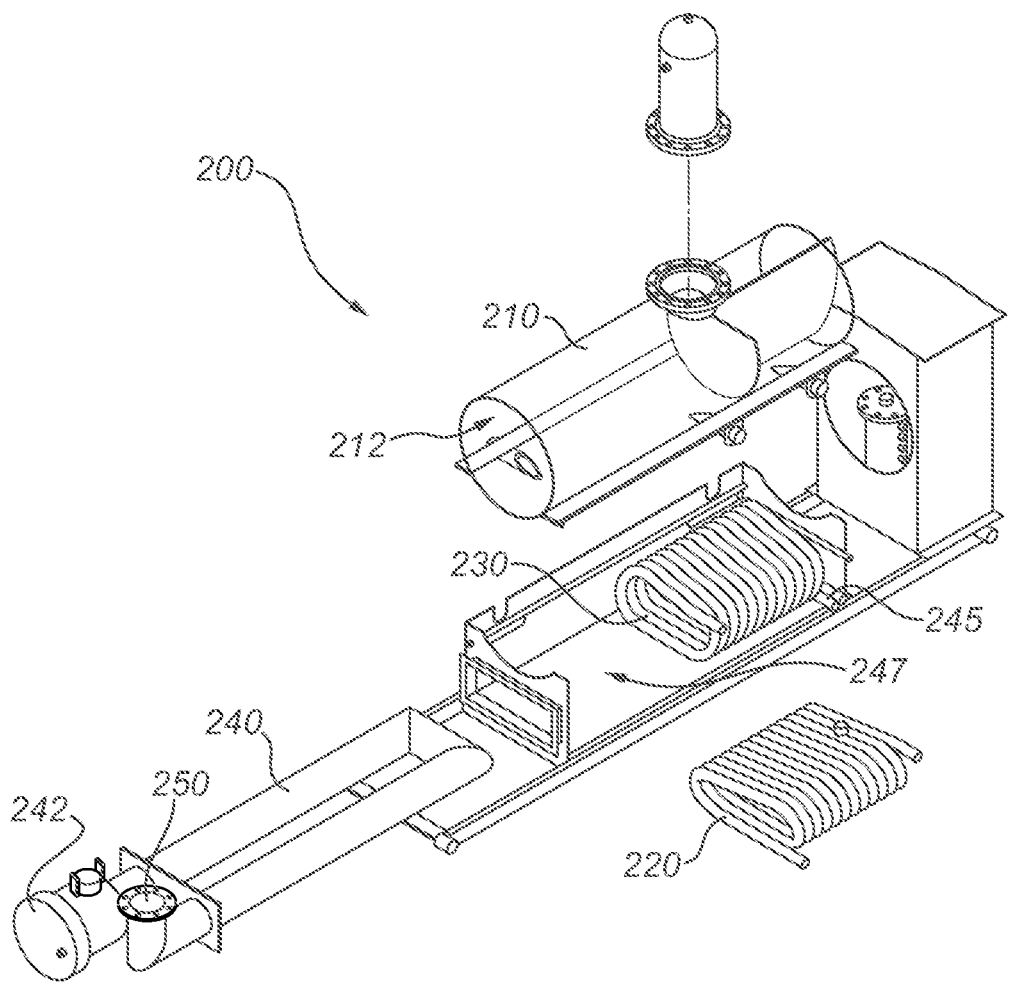
FIG. 6 is an exploded view of a second embodiment of a separator in accordance with the present disclosure, with "flattened" helical emulsion piping coils configured to closely surround a conventional U-shaped firetube.
Figure 7:
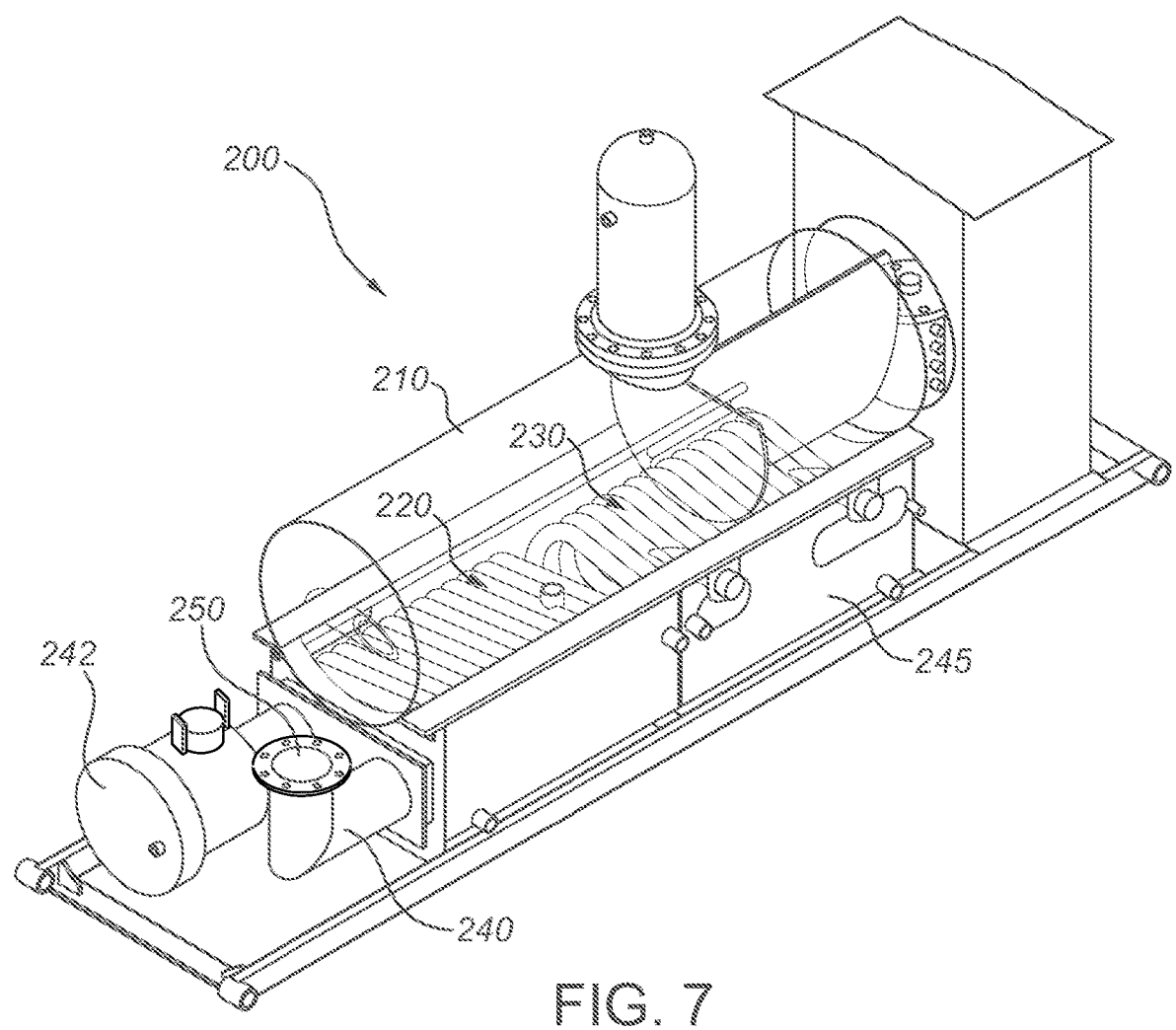
FIG. 7 is an isometric view of the separator in FIG. 6, fully assembled.

Referring now to FIGS. 6-7, a horizontal separator 200 in accordance with an alternative embodiment has a separator vessel 210 having an interior chamber 212 mounted above an insulated burner enclosure 245 which has an interior chamber 247 housing generally elliptical (or "flattened") helical emulsion coils 220 and 230 wrapped around a U-shaped firetube 240 (with associated burner 242 and exhaust 250). During operation of separator 200, emulsion is preheated by flowing through emulsion coils 220 and 230, before flowing into interior chamber 212 of vessel 210 for further separation. Advantages of this design (over and above previously-noted advantages resulting from the use of helical emulsion coils instead of straight-run piping with small-radius elbows) include the fact that the firetube and emulsion piping are outside of vessel 210, which allows vessel 210 to have a smaller volume for a given emulsion throughput. At the same time, sufficient heat can be transferred to vessel 210 to keep paraffins in the emulsion liquefied.

Figure 8:
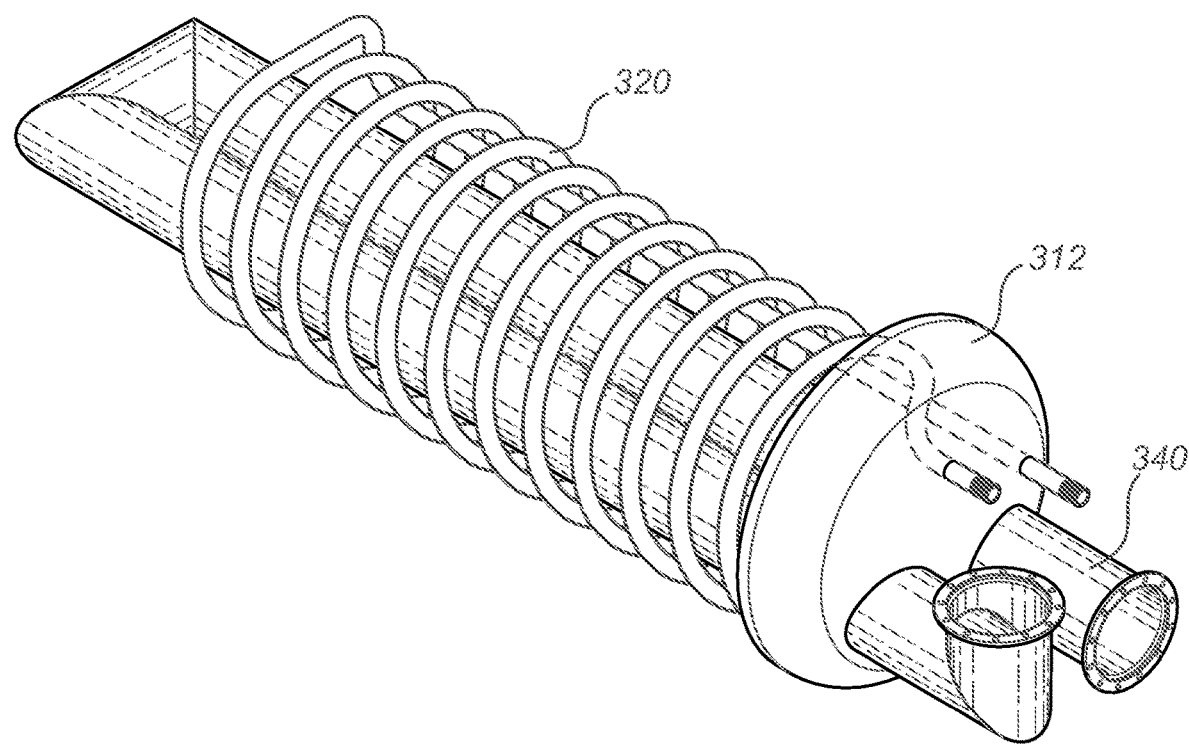
FIG. 8 is an isometric view of an alternative embodiment of a vessel head/firetube/emulsion piping subassembly in accordance with the present disclosure, with a quick-removal head carrying a conventional U-shaped firetube surrounded by a helical emulsion piping coil.

FIG. 8 illustrates a subassembly comprising a quick-removal vessel head 312 and a helical emulsion coil 320 in accordance with the present disclosure, in combination with a prior art U-shaped firetube 340. This subassembly can be used to retrofit prior art separators (such as but not limited to the separator shown in FIG. 1) to obtain the operational benefits of helical emulsion coils over straight-run emulsion piping, as well as the quick-removal vessel head, without needing to replace the existing firetube burner.

It will be readily appreciated by those skilled in the art that various modifications to embodiments in accordance with the present disclosure may be devised without departing from the scope of the present teachings, including modifications which may use equivalent structures or materials hereafter conceived or developed. It is to be especially understood that the scope of the present disclosure is not intended to be limited to described or illustrated embodiments, and that the substitution of a variant of a claimed or illustrated element or feature, without any substantial resultant change in functionality, will not constitute a departure from the scope of the disclosure.

Although the specific embodiments described and illustrated herein relate to horizontally-oriented, high-pressure separators, this is by way of non-limiting example only. Persons of ordinary skill in the art will appreciate that principles and concepts associated with the specific embodiments disclosed herein may also be adapted and applied to separators of different physical configurations (such as but not limited to vertically-oriented separators) without departing from the scope of the present disclosure, and that the practical applicability of such principles and concepts is not limited to or restricted by any particular range of operating pressures.

In this patent document, any form of the word "comprise" is to be understood in its non-limiting sense to mean that any element or feature following such word is included, but elements or features not specifically mentioned are not excluded. A reference to an element by the indefinite article "a" does not exclude the possibility that more than one such element is present, unless the context clearly requires that there be one and only one such element. Any use of any form of the terms "connect", "engage", "couple", "attach", or any other term describing an interaction between elements is not meant to limit the interaction to direct interaction between the subject elements, and may also include indirect interaction between the elements such as through secondary or intermediary structure.

Relational terms such as (but not limited to) "vertical", "horizontal", "parallel", "elliptical", and "coaxial" are not intended to denote or require absolute mathematical or geometrical precision. Accordingly, such terms are to be understood as denoting or requiring substantial precision only (e.g., "substantially parallel" or "substantially coaxial") unless the context clearly requires otherwise. Wherever used in this document, the terms "typical" and "typically" are to be interpreted in the sense of representative of common usage or practice, and are not to be understood as implying essentiality or invariability.

What is claimed is:

1. A separator assembly comprising:
   (a) a horizontal separator vessel having an interior chamber, a first open end, and a first removable vessel head for sealably closing said first open end of the horizontal separator vessel;
   (b) a single-cylinder firetube having a first end, a closed second end, and a firetube bore, and being disposable with the interior chamber of the horizontal separator vessel, said firetube defining a first firetube chamber and a second firetube chamber, wherein said first and second firetube chambers are semi-cylindrical chambers defined by a baffle plate bisecting the firetube bore between the first end of the firetube and a free end of the baffle plate disposed a selected distance away from the closed second end of the firetube, such that the first and second firetube chambers are in fluid communication around the free end of the baffle plate;

(c) a burner operationally located at an outer end of the first firetube chamber; and (d) one or more helical coils for receiving a flow of emulsion, said one or more helical coils being coiled around and adjacent to the exterior of the firetube.

2. The separator assembly as in claim 1 wherein the one or more helical coils are of generally circular configuration as seen in end view.

3. The separator assembly as in claim 1 wherein the one or more helical coils are of generally elliptical configuration as seen in end view.

4. The separator assembly as in claim 1 wherein the burner is a gas-fired burner.

5. The separator assembly as in claim 1 wherein the horizontal separator vessel has a second open end and a second removable vessel head for sealably closing said second open end.

6. The separator assembly as in claim 1, further comprising a vertical high-pressure bottle for receiving heated emulsion, where said heated emulsion will then begin to separate.

7. The separator assembly as in claim 1 wherein the one or more helical coils, the firetube, and the first vessel head form a subassembly that is removable from the interior chamber of the horizontal separator vessel.

8. The separator assembly as in claim 7 wherein the subassembly includes the burner.

\* \* \* \* \*